United States Patent [19]

Locatelli

[11] Patent Number: 4,887,433
[45] Date of Patent: Dec. 19, 1989

[54] LIQUEFIED GAS TRANSFER LINE HAVING AT LEAST ONE BYPASS FOR THE VAPORS OF SAID GAS

[75] Inventor: Marcel Locatelli, Ismier, France

[73] Assignee: Commissariat A L'Energie Atomique, Paris, France

[21] Appl. No.: 284,364

[22] Filed: Dec. 14, 1988

[30] Foreign Application Priority Data

Dec. 22, 1987 [FR] France .................. 8717889

[51] Int. Cl.$^4$ .............................................. F17C 13/00
[52] U.S. Cl. .................................................... 62/50.7
[58] Field of Search ............................................ 62/55

[56] References Cited

U.S. PATENT DOCUMENTS

| | | | |
|---|---|---|---|
| 3,034,319 | 5/1962 | Chelton ................................ | 62/531 |
| 3,068,026 | 12/1962 | McKamey ............................ | 62/55 |
| 3,430,450 | 3/1969 | Bogner et al. ....................... | 62/55 |
| 3,466,886 | 9/1969 | Doose et al. ......................... | 62/55 |
| 3,626,717 | 12/1971 | Lorch ................................... | 62/55 |
| 3,945,215 | 3/1976 | Johnson et al. ...................... | 62/55 |
| 3,986,341 | 10/1976 | DeHaan ............................... | 62/55 |
| 3,991,587 | 11/1976 | Laskaris ............................... | 62/55 |
| 3,991,588 | 11/1976 | Laskaris ............................... | 62/55 |
| 3,992,169 | 11/1976 | Loudon ................................ | 62/55 |
| 4,011,732 | 3/1977 | Doherty ............................... | 62/55 |
| 4,018,059 | 4/1977 | Hatch ................................... | 62/55 |
| 4,036,617 | 7/1977 | Leonard et al. ..................... | 62/55 |
| 4,036,618 | 7/1977 | Leonard et al. ..................... | 62/55 |
| 4,207,745 | 6/1980 | Pouillange ........................... | 62/55 |

FOREIGN PATENT DOCUMENTS

| | | |
|---|---|---|
| 1528919 | 5/1964 | Fed. Rep. of Germany . |
| 2208264 | 2/1972 | Fed. Rep. of Germany . |
| 1432297 | 12/1966 | France . |
| 2587444 | 3/1987 | France . |

Primary Examiner—Ronald C. Capossela
Attorney, Agent, or Firm—Kerkam, Stowell, Kondracki & Clarke

[57] ABSTRACT

Line for transferring a liquefied gas between a storage vessel and a use vessel. It comprises a transfer tube (10), an outer tube (12) surrounding the transfer tube (10) and a shield (14) formed by an element located between the transfer tube (10) and the outer tube (12). Bypasses (16,18,20,22) having one end connected to the transfer tube (10) in thermal contact with the shield (14) for establishing a heat exchange relationship between said shield and the liquefied gas vapors and another end connected to a liquefied gas vapor recovery line.

9 Claims, 1 Drawing Sheet

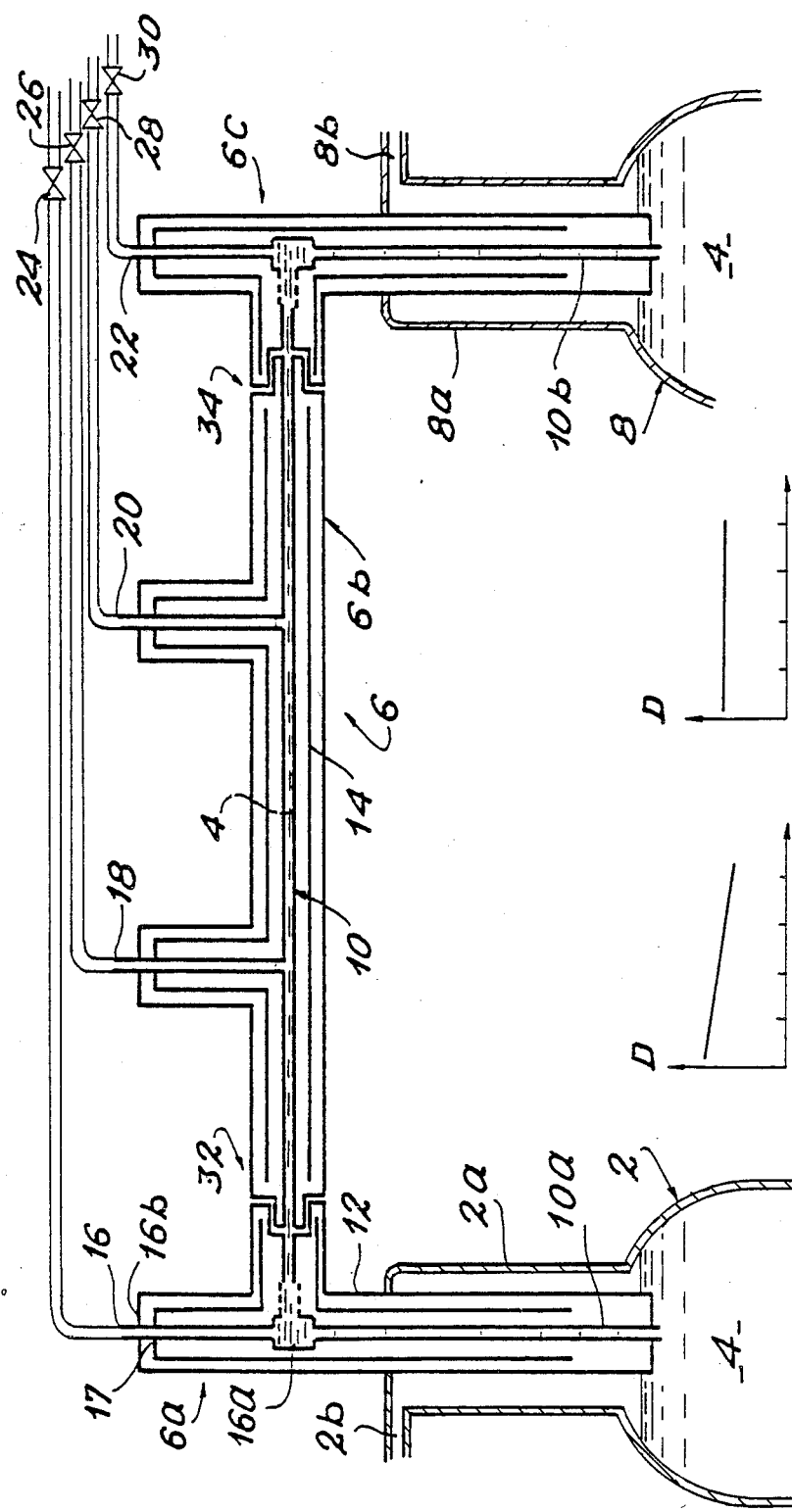

LIQUEFIED GAS TRANSFER LINE HAVING AT LEAST ONE BYPASS FOR THE VAPORS OF SAID GAS

DESCRIPTION

The present invention relates to a liquefied gas transfer line for the transfer of a liquefied gas between a storage vessel and a use vessel, having a transfer tube with a first end connected to the storage vessel and a second end which can be connected to the use vessel, an outer tube surrounding the transfer tube and defining with the latter a volume, and a shield formed by an element located in the internal volume between the transfer tube and the outer tube, said shield having at least one zone in contact with a heat exchanger in order to establish a heat exchange relationship between said shield and the vapours of the liquefied gas.

Transfer lines for cryogenic fluid make it possible to transport a cryogenic fluid from a storage tank to a use tank. The increasing use of cryogenic fluids in ever more widely varying fields has created a need for cryogenic transfer lines having good thermal performance characteristics. Thus, as a result of its boiling point, which is well below ambient temperature, the liquid is exposed to a parasitic heat flow by radiation, conduction and convection. This leads to an evaporation of the liquefied gas, which causes a liquid loss and constitutes an important disadvantage.

For this reason attempts have been made in the prior art to produce liquefied gas transfer lines having low line thermal losses, i.e. in which the fluid is heated and vaporizes to the least possible extent during its transfer from one tank to another. In addition, the transfer line must have a low thermal inertia, which means that a transfer line at ambient temperature must be rapidly coolable to its use temperature.

The prior art already discloses liquid gas transfer lines making it possible to achieve the above objectives.

A good thermal insulation from the external medium is obtained by the use of an insulating medium between the transfer tube and the outer tube. This insulation can be constituted by a thick envelope of an insulating material such as foam or by a space under vacuum, which makes it possible to limit the heat supply by convection and conduction to the gas. It is also known to use a layer of superinsulant constituted e.g. by metallized plastic films between the transfer tube and the outer tube. This superinsulating material makes it possible to reduce the heat flow by radiation.

It is also known to place a heat shield in the space between the transfer tube and the outer tube. The shield has the function of further reducing the flow by radiation. Moreover, it can be cooled by another fluid or by the cold vapours resulting from the evaporation of the cryogenic liquid. For example, French Patent Application 2 587 444, filed on Sept. 19th, 1985 describes a liquefied gas transfer line having a heat shield equipped with an exchanger. The shield is formed by a tubular element having at least one end in contact with a heat exchanger in order to establish a heat exchange relationship between the shield and the vapours of the liquefied gas, an exchange gas quantity also being contained in the internal volume.

The various solutions given herinbefore make it possible to very greatly reduce the parasitic heat supplies from the outside by a factor of a few dozen. However, the making cold period increases with the complexity of the transfer line and to reduce this, it is known to introduce a certain gas quantity between the transfer tube and the outer tube in order to ensure that this takes place more rapidly. The gas is then cryopumped when the inner duct is cold, which eliminates conduction by the cooling gas. However, in a transfer line of this type, the vapour introduced into the duct must completely traverse it before being recovered.

It is also known to ensure the return of vapours to the starting vessel, i.e. the storage vessel. In this case, the transfer line length is limited because the vapours are reheated and, as from a certain transfer line length, they no longer make it possible to cool the shield because their temperature has become too high. The line is not autonomous. Its operation is linked with the nature of the source and the use (vessel, cryostat, etc).

Furthermore, in all aforementioned transfer lines, it is necessary to provide spacers between the outer tube and the transfer tube and when the transfer line has an intermediate shield, between said transfer tube and the outer tube. The spacers are responsible for a considerable part of the parasitic heat supply by conduction.

The present invention relates to a liquefied gas transfer line which, whilst retaining the advantages of the known transfer lines, namely relatively low heat losses in the line and a relatively sort cooling period, makes it also possible to provide certain supplementary advantages. It must make it possible to limit the heat conduction by the spacers and must also make it possible to produce transfer lines of a considerable length.

According to the invention, these objectives are achieved by the fact that the transfer line has at least one bypass with one end connected to the transfer tube and a second end connected to a line for recovering the vapours of the liquefied gas, as well as a means for regulating the passage cross-section of the bypass, the latter being in thermal contact with the shield.

As a result of these characteristics, the vapours of the cryogenic fluid are taped along the transfer line and their enthalpy is used for cooling a shield or shields of appropriate sizes. The means for regulating the passage cross-section of the bypass make it possible to fix the separation level between the liquid and the vapour in each of the bypasses in the vicinity of the wall of the transfer tube. The shields are brought into heat contact with the bypasses. This leads to the advantages that the vapours do not pass through the entire length of the transfer pipe and consequently are not heated. Therefore, the cooling efficiency is improved. The bypasses serve as spacers between the transfer tube and the outer tube and between the latter and shield or intermediate shields. The circulation of the cold vapours thus makes it possible to limit the heat flux by conduction in the bypass.

Another advantage is that it is possible to obtain a transfer line of considerable length by providing a plurality of bypasses regularly distributed over the length of said line. Thus, in view of the fact that the cold vapours do not pass through the entire length of the line, the length of the latter can be increased. Finally, the cooling speed can be increased by action on the conductance (passage cross-section) of the vapour recovery ducts, i.e. on the means for regulating the passage cross-section of the bypass, said means being e.g. constituted by a manual valve or any automatic system.

Other features and advantages of the invention can be gathered from the following description of a non-limitative embodiment and the attached drawings, wherein show:

FIG. 1 a transfer line according to the invention.

FIGS. 2 and 3 graphs illustrating a process making it possible to reduce the cooling time.

In FIG. 1, reference 2 designates a storage vessel containing a liquefied gas 4. This gas must be passed by means of the transfer line 6 to a use vessel 8. The storage vessel 2 has a neck 2a to which is connected a duct 2b making it possible to discharge the vapours produced in the storage vessel 2. In the same way, the use vessel 8 has a neck 8a to which is connected a discharge duct 8b for the cold vapours of the liquefied gas 4.

The transfer line according to the invention is constituted by a transfer tube 10 surrounded by an outer tube 12. The transfer tube 10 has a first end 10a immersed in the liquid contained in the storage vessel and a second end 10b immersed in the liquid contained in the use vessel.

The outer tube 12 is sealed at each of its ends, respectively at its end immersed in the storage vessel and at its end immersed in the use vessel. Moreover, a heat shield 14 is placed between the transfer tube 10 and the outer tube 12. As stated hereinbefore, the function of said heat shield is to reduce the supply of heat by radiation from the outside.

According to the invention, a plurality of bypasses 16,18, 20,22 is provided and each is connected by one end to the transfer tube 10. Valves 24,26,28 and 30 are placed on each of the bypasses 16,18,20,22. The function of these valves is to regulate the passage cross-section offered to the steam contained in the ducts 16,18,20,22 and consequently regulates the separation level between the liquid and the steam or vapour. Preferably this level is regulated in such a way that it is approximately level with the outer wall of transfer tube 10.

The transfer line functions in the following way. The cold vapours circulating in bypasses 16,18,20, and 22 cool that part of the bypasses located within the outer tube 10. For example, for duct or bypass 16, the gas cools its portion located between its end 16a linked with the transfer tube 10 and point 16b, where said duct traverses the outer tube 12. Preferably, that portion of duct 16 located between points 16a and 16b is made from a poor heat conducting material. The enthalpy of the cold vapours of the gas flowing in ducts 16 is imparted to the intermediate shield 14. A good thermal contact is ensured between shield 14 and each of the bypasses 16,18,20 and 22. Thus, there is a heat exchange at contact point 17 between the shield and the bypass. Thus, the shield 14 instead of being cooled only at one of its ends by an exchanger, or over its entire length by a gas which progressively heats, in accordance with the prior art, is cooled at regular intervals. Thus, the effectiveness of said cooling is improved.

In the embodiment shown in FIG. 1, the transfer line is in three parts, namely a vertical part 6a introduced into the neck 2a of storage vessel 2, an intermediate horizontal section 6b and finally a vertical part 6c introduced into the neck 8a of the storage vessel 8. Part 6a is connected to the intermediate horizontal part 6b via a male/female coupling 32. In the same way, the intermediate part 6b is connected to parts 6c via a male/female coupling 34. Couplings 32 and 34 are e.g. Johnston couplings. Therefore the intermediate part 6b constitutes an autonomous line section, which can form part of a longer line merely interconnecting end-to-end several sections, such as section 6b. As can be gathered from FIG. 1, the insulation gaps of each of the sections constituting the line are separate. According to another embodiment, the transfer line can be in one piece with the vertical portions 6a and 6c.

Moreover, it should be noted that the intermediate shield 14 has been shown in one piece. However, said intermediate shield can be in the form of several sections, which may or may not be thermally insulated with respect to one another, each of said sections of the shield being in thermal contact with one of the bypasses 16,18,20 and 22.

Shield 14 is constituted by a strand of good heat conducting material. It can also be constituted by an open or closed tube.

FIGS. 2 and 3 are two graphs illustrating a process permitting a faster cooling of a transfer line according to the invention. FIG. 2 shows the gas flow rate D (or passage cross-section offered to said gas) contained in each of the bypasses 16,18,20,22. During the cooling period, valve 24 is widest open, so as to offer a maximum passage cross-section. Thus, there is an increased gas evaporation at level 16a and consequently an accelerated cooling of the sections located between points 16a and 16b of bypass 16. Valves 26,28 and 30 open to a decreasing extent. FIG. 3 shows the equilibrium position when the cooling of the transfer line has been obtained. It can be seen that valves 24,26,28 and 30 are open by the same amount.

I claim:

1. Liquefied gas transfer line for the transfer of a liquefied gas between a storage vessel and a use vessel having a transfer tube with a first end connected to the storage vessel and a second end connectable to the use vessel, an outer tube surrounding the transfer tube and defining with the latter a volume, and a shield formed by an element placed between the internal volume between the transfer tube and the outer tube, the shield having at least one zone in contact with a heat exchanger in order to establish a heat exchange relationship between said shield and the liquefied gas vapors, characterized by at least one bypass having one end connected to the transfer tube and a second end connected to a liquefied gas vapor recovery line, together with means for regulating the passage cross-section of said at least one bypass, which is in thermal contact with said shield.

2. Transfer line according to claim 1, characterized in that it has a coupling at each of its ends.

3. Transfer line according to claim 2, characterized in that the coupling is a Johnston coupling.

4. Transfer line according to claim 1, characterized in that the volume between the transfer tube and the shield and/or volume between the shield and the outer tube is at least partly filled with a superinsulating material.

5. Transfer line according to claim 1, characterized in that the shield is constituted by an open or closed tube.

6. Transfer line according to claim 1, characterized in that the shield is constituted by a strand made from a good heat conducting material.

7. Transfer line according to claim 1, characterized in that the at least one bypass is made from a poor heat conducting material in order to constitute a reduced heat flux spacer.

8. Liquefied gas transfer line for the transfer of a liquefied gas between a storage vessel and a use vessel having a transfer tube with a first end connected to the storage vessel and a second end connectable to the use vessel, an outer tube surrounding the transfer tube and defining with the latter a volume, a shield formed by a tube placed in the internal volume between the transfer tube and the outer tube, the shield having at least one zone in contact with a heat exchanger in order to establish a heat exchange relationship between said shield and the liquefied gas vapours, at least one bypass having one end connected to the transfer tube and a second end connected to a liquefied gas vapour recovery line, means for regulating the passage cross-section of said at least one bypass, the latter being in thermal contact with said shield and being made from a poor heat conducting material in order to constitute a reduced heat flux spacer and a coupling at each of the ends of the transfer line, the volume between the transfer tube and the shield and/or the volume between the shield and the outer tube being at least partly filled with a superinsulating material.

9. Liquefied gas transfer line for the transfer of a liquefied gas between a storage vessel and a use vessel having a transfer tube with a first end connected to the storage vessel and a second end connectable to the use vessel, an outer tube surrounding the transfer tube and defining with the latter a volume, a shield formed by a strand made from a good heat conducting material placed in the internal volume between the transfer tube and the outer tube, the shield having at least one zone in contact with a heat exchanger to establish a heat exchange relationship between said shield and the liquefied gas vapours, at least one bypass having one end connected to the transfer tube and a second end connected to a liquefied gas vapour recovery line, means for regulating the passage cross-section of said at least one bypass, the latter being in thermal contact with said shield and being made from a poor heat conducting material in order to constitute a reduced heat flux spacer and a coupling at each of the ends of the transfer line, the volume between the transfer tube and the shield and/or the volume between the shield and the outer tube being at least partly filled with a superinsulating material.

* * * * *